(12) United States Patent
Wells et al.

(10) Patent No.: US 9,570,943 B2
(45) Date of Patent: *Feb. 14, 2017

(54) ELECTRICAL ACCUMULATOR UNIT FOR PROVIDING AUXILIARY POWER TO AN ELECTRICAL NETWORK

(71) Applicant: P.C. Krause & Associates, Inc., West Lafayette, IN (US)

(72) Inventors: Jason R. Wells, Zionsville, IN (US); Marco Amrhein, Champaign, IL (US); Eric A. Walters, Brownsburg, IN (US); Steven M. Iden, Centerville, OH (US)

(73) Assignee: PC Krause & Associates, Inc., West Lafayette, IN (US)

( * ) Notice: Subject to any disclaimer, the term of this patent is extended or adjusted under 35 U.S.C. 154(b) by 748 days.

This patent is subject to a terminal disclaimer.

(21) Appl. No.: 13/936,834

(22) Filed: Jul. 8, 2013

(65) Prior Publication Data
US 2016/0380478 A1    Dec. 29, 2016

Related U.S. Application Data

(63) Continuation of application No. 12/614,103, filed on Nov. 6, 2009, now Pat. No. 8,513,829.

(60) Provisional application No. 61/198,452, filed on Nov. 6, 2008.

(51) Int. Cl.
*H02J 9/06* (2006.01)
*H02M 7/70* (2006.01)
*H02M 7/797* (2006.01)
*H02J 1/10* (2006.01)

(52) U.S. Cl.
CPC ............... *H02J 9/066* (2013.01); *H02M 7/70* (2013.01); *H02M 7/797* (2013.01)

(58) Field of Classification Search
CPC ....................................................... H02J 1/10
USPC ..................................... 307/9.1, 43, 46, 64
See application file for complete search history.

(56) References Cited

U.S. PATENT DOCUMENTS

| | | |
|---|---|---|
| 5,329,222 A | 7/1994 | Gyugyi et al. |
| 5,850,113 A | 12/1998 | Weimer et al. |
| 6,051,941 A | 4/2000 | Sudhoff et al. |
| 7,571,683 B2 | 8/2009 | Kumar |
| 7,786,616 B2 | 8/2010 | Naden et al. |
| 8,164,283 B2 | 4/2012 | Sheahan, Jr. et al. |
| 8,461,717 B2 | 6/2013 | Swenson et al. |
| 8,513,829 B1 * | 8/2013 | Wells ............... B60L 11/005 307/9.1 |
| 2005/0057875 A1 | 3/2005 | Kover et al. |
| 2008/0049475 A1 | 2/2008 | Watanabe et al. |
| 2009/0302153 A1 | 12/2009 | Matasso et al. |
| 2010/0109581 A1 | 5/2010 | Sheahan et al. |

* cited by examiner

*Primary Examiner* — Robert Deberadinis
(74) *Attorney, Agent, or Firm* — Ice Miller LLP

(57) ABSTRACT

An electrical accumulator unit wherein an energy storage device is utilized in conjunction with an actively controlled bidirectional power converter to provide auxiliary power to an electrical network is disclosed.

32 Claims, 9 Drawing Sheets

Functional block description of specific EAU embodiment

Transient power profile in a representative modern MEA a) Generator / load / EAU power profile b) EAU ESD voltage c) Primary inductor current in EAU d) Bus Voltage

ELECTRICAL ACCUMULATOR UNIT FOR PROVIDING AUXILIARY POWER TO AN ELECTRICAL NETWORK

CROSS-REFERENCE TO RELATED APPLICATIONS

The present application claims the benefit of U.S. Provisional Patent Application Ser. No. 61/198,452 filed Nov. 6, 2008 entitled "Electrical Accumulator Unit for Providing Emergency Power to an Electrical Network" which is hereby incorporated by reference in its entirety.

GOVERNMENT RIGHTS CLAUSE

This invention was made with Government support under Contract Number FA8650-04-D-2409 awarded by the U.S. Air Force. The United States Air Force has certain rights in the invention.

TECHNICAL FIELD OF THE INVENTION

The present disclosure relates generally to electrical energy storage devices and, more specifically, to an electrical accumulator unit for providing auxiliary power to an electrical network.

BACKGROUND OF THE INVENTION

The movement to more-electric aircraft (MEA) architectures during the past decade in military and commercial aircraft systems continues to increase the complexity of designing and specifying the electric power system (EPS). The addition of numerous high-power electric loads has drastically altered the dynamics of power flow on the electrical bus. Such loads include electro-hydrostatic actuators (EHAs), electromechanical actuators (EMAs), advanced radar, and directed energy weapons (DEW). Although these loads represent a relatively small portion of the average power draw from the EPS, the short-term transient power may exceed twice the average power capabilities of the generator, with peak-to-average power ratios in excess of 5-to-1 for brief periods of time (50-5000 ms). In addition to this high peak-power, some of the loads can produce regenerative power flow during deceleration of motors and drive trains which is equal to peak power draw for brief periods of time (typically 20-200 ms).

There exists a wide variety of architectures which are capable of addressing the challenges of this dynamic power profile. For example, one architecture is to force regenerative power to be handled locally with diodes and/or power resistors and to size the generator (including the gearbox, shafts, etc.) to be capable of peak power generation. Such architecture can be challenging to design and may lead to an unnecessarily large increase in system weight due to increased demands on the thermal systems and derating of key mechanical components in the generator drive-train.

Another viable approach is to allow the electrical bus to support bidirectional power flow all the way back to the engine. Aircraft generators often already have the requisite power electronics to support bi-directional power flow due to their dual role of providing main-engine start capability. While this approach reduces the thermal concerns associated with burning regenerative power locally, it actually increases the derating factors required in the mechanical drive-train of the generator which again could result in increased system weight. In addition, such architecture requires all sources (i.e. emergency power units, auxiliary power units, battery, and ground power carts) to support bi-directional power flow. The resulting increase in size, weight and cost associated with these sources may be unacceptable in relation to the system design and cost constraints. A need exists for an improved design which increases the load-handling capabilities of the aircraft electric power system while minimizing the weight and size requirements of the associated components.

SUMMARY OF THE INVENTION

According to one aspect, a device for providing auxiliary power to an electrical network is disclosed, comprising an energy storage device, and an actively controlled power converter operatively coupled to the energy storage device, wherein said actively controlled power converter is configured to provide automatic bidirectional power flow into and out of the electrical network from and to, respectively, the energy storage device in response to at least one measured electrical property within the electrical network. The device may further comprise a plurality of electronic switches and a plurality of diodes, with each one of the diodes connected across the collector and emitter of one of the electronic switches such that the forward bias current of each one of the diodes is from the emitter to the collector of the corresponding electronic switch.

In another aspect, the plurality of electronic switches comprises two low side electronic switches and two high side electronic switches, wherein the emitter of each low side electronic switch is connected to a neutral bus and the collector of each low side electronic switch is connected to at least one inductor in the actively controlled power converter. The collector of each high side electronic switch is connected to the positive bus in the electrical network and the emitter of each high side electronic switch is connected to the at least one inductor in the actively controller power converter.

According to another aspect, a method for controlling power flow into an electrical network from an EAU and out of the electrical network to the EAU is disclosed, comprising the acts of (a) sensing at least one electrical property of the electrical network; and (b) providing automatic bidirectional power flow into and out of the electrical network from and to, respectively, the EAU in response at least in part to the at least one sensed electrical property. The method may further comprise the acts of (a) sensing a required load power; (b) determining an upper EAU power limit which will prevent a primary power source from exceeding a primary power source upper limit; (c) determining a lower EAU power limit which will prevent the primary power source from exceeding a primary power source lower limit; (d) determining a commanded power value based on a voltage differential between the energy storage device and a nominal voltage; (e) ensuring that the commanded power value does not exceed the upper EAU power limit or the lower EAU power limit; (f) determining a first duty ratio of the actively controlled power converter based on the commanded power value; and (g) applying the first duty ratio to the actively controlled power converter to sink or source power to the electrical network.

In yet another aspect, the first duty ratio D is used to control at least one low side electronic switch within the power converter and a value of (1-D) is used as a second duty ratio to control at least one high side electronic switch within the power converter. The same relative switching order may be used to control the low side and high side electronic switches in the power converter regardless of whether the EAU is sourcing or sinking power to the electrical network. A proportional integral controller may also be used to determine an idealized output voltage of the power converter based on a differential between a first commanded power value and a measured EAU power value. The duty ratio may further be determined based on the idealized power converter output voltage, a measured voltage across the energy storage device, and a measured voltage across a bus of the electrical network.

DETAILED DESCRIPTION OF THE PREFERRED EMBODIMENTS

Figure 1:
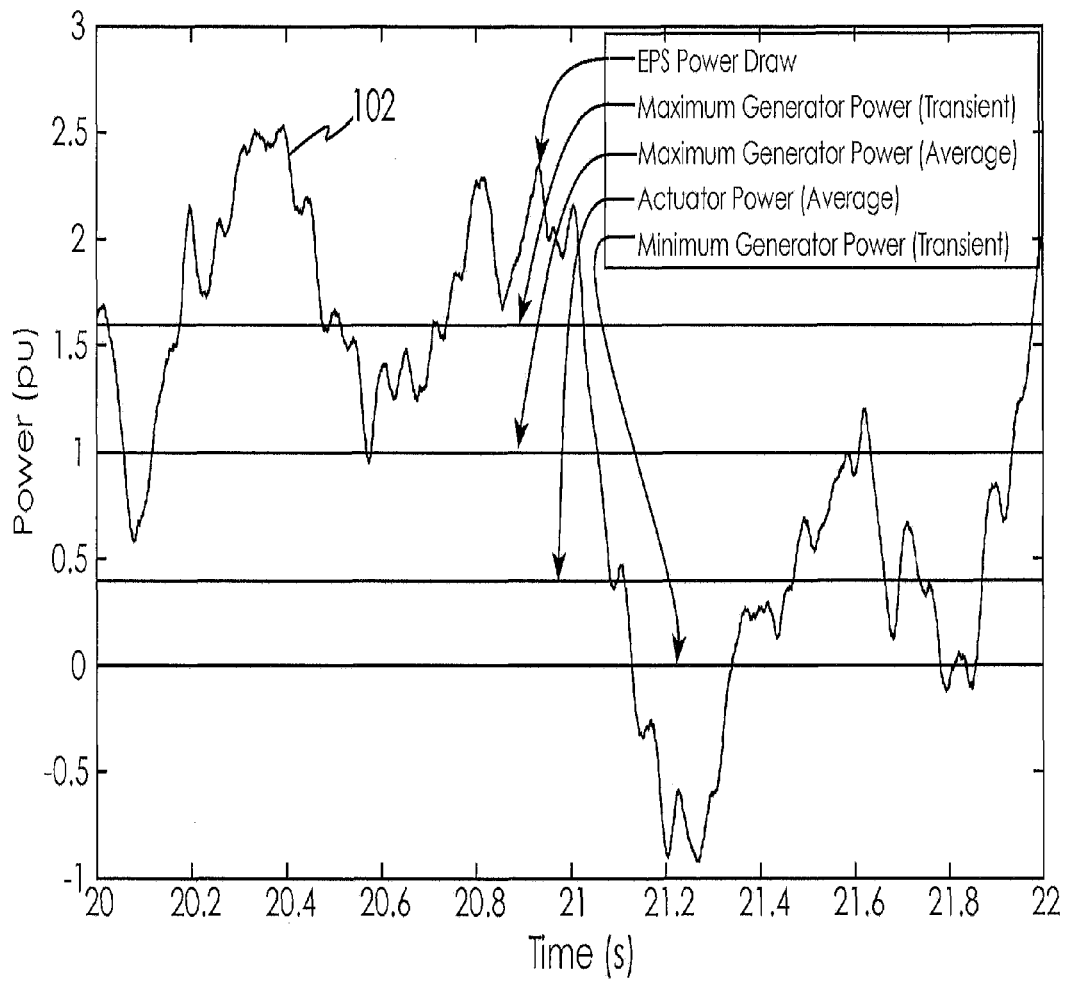
FIG. 1 is graph of a transient power profile in a representative modern MEA.

For the purposes of promoting an understanding of the principles of the invention, reference will now be made to the embodiment illustrated in the drawings and specific language will be used to describe the same. It will nevertheless be understood that no limitation of the scope of the invention is thereby intended, and alterations and modifications in the illustrated device, and further applications of the principles of the invention as illustrated therein are herein contemplated as would normally occur to one skilled in the art to which the invention relates.

FIG. 1 shows a representative power profile 102 which might be seen on a typical modern electric aircraft during a significant maneuver. As illustrated, large swings in required dynamic power are common, however these transients typically occur for brief periods of time between periods with significantly reduced dynamics (i.e., when the aircraft is cruising at a steady altitude). It shall be understood that the exact distribution of power delivery requirements is highly dependent upon the species of a given aircraft application and the power profile 102 shown in FIG. 1 is only one potential distribution profile. It shall be further understood that the embodiments described herein may be implemented in other types of electrical networks, including those found in terrestrial and marine vehicles and those utilized in non-moving environments.

In the example of FIG. 1, the maximum generator power capability is approximately 1.6 per unit (pu), which is approximately 1 pu below the peak power required during the maneuver. The generator is also not generally capable of handling regenerative loads, however, the peak regenerative power required during the maneuver is approximately −1 pu. The EPS generator could be sized to accommodate the peak and regenerative power transients such as those shown in FIG. 1, although this would likely result in a significantly oversized architecture and impose an unnecessary weight penalty on the aircraft.

Figure 2:
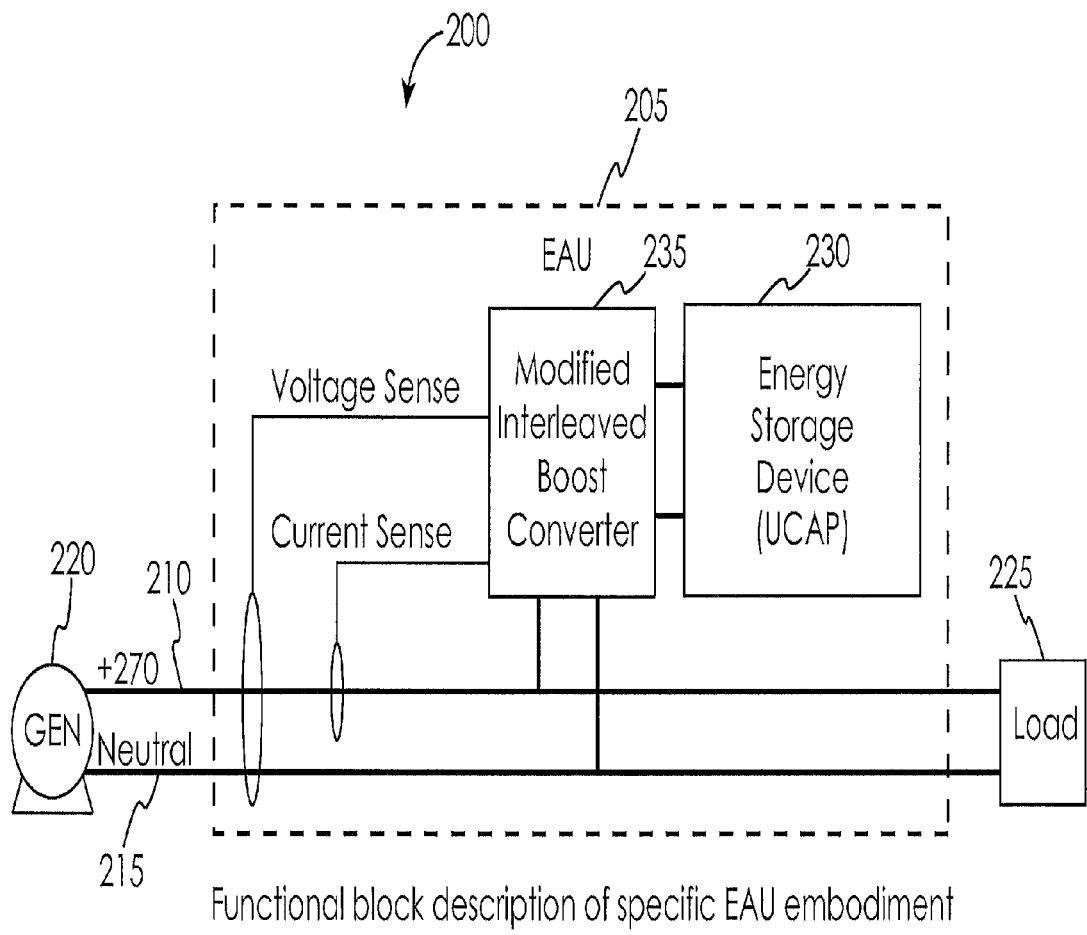
FIG. 2 is block diagram of an electrical accumulator unit (EAU) according to one embodiment of the present disclosure.

FIG. 2 shows a block diagram of an electrical power system 200 according to one embodiment of the present disclosure. An electrical accumulator unit (EAU) 205 is placed across the electrical power bus lines 210,215 between the main power source (shown here as generator 220) and the load 225. The EAU is sized to handle a portion of the peak power transients which can occur for short times during a significant aircraft maneuver, but are beyond the capabilities of the generator 220. It shall be understood that the ratio of power sharing between the EAU 205 and the generator 220 may be adjusted depending on the requirements of the particular application. It shall be further understood that while the illustrated electrical power bus line 210 is shown as a +270 Vdc bus, other voltage bus levels are contemplated to be compatible with use of the system 200 of the present disclosure. The EAU 205 comprises an energy storage device (ESD) 230 which is operatively coupled with a power converter 235 as shown. In addition, the EAU 205 is optionally configured to sense the bus voltage and source current to generate a reference duty ratio which controls the power-electronic device switching within the power converter 235.

Figure 3:
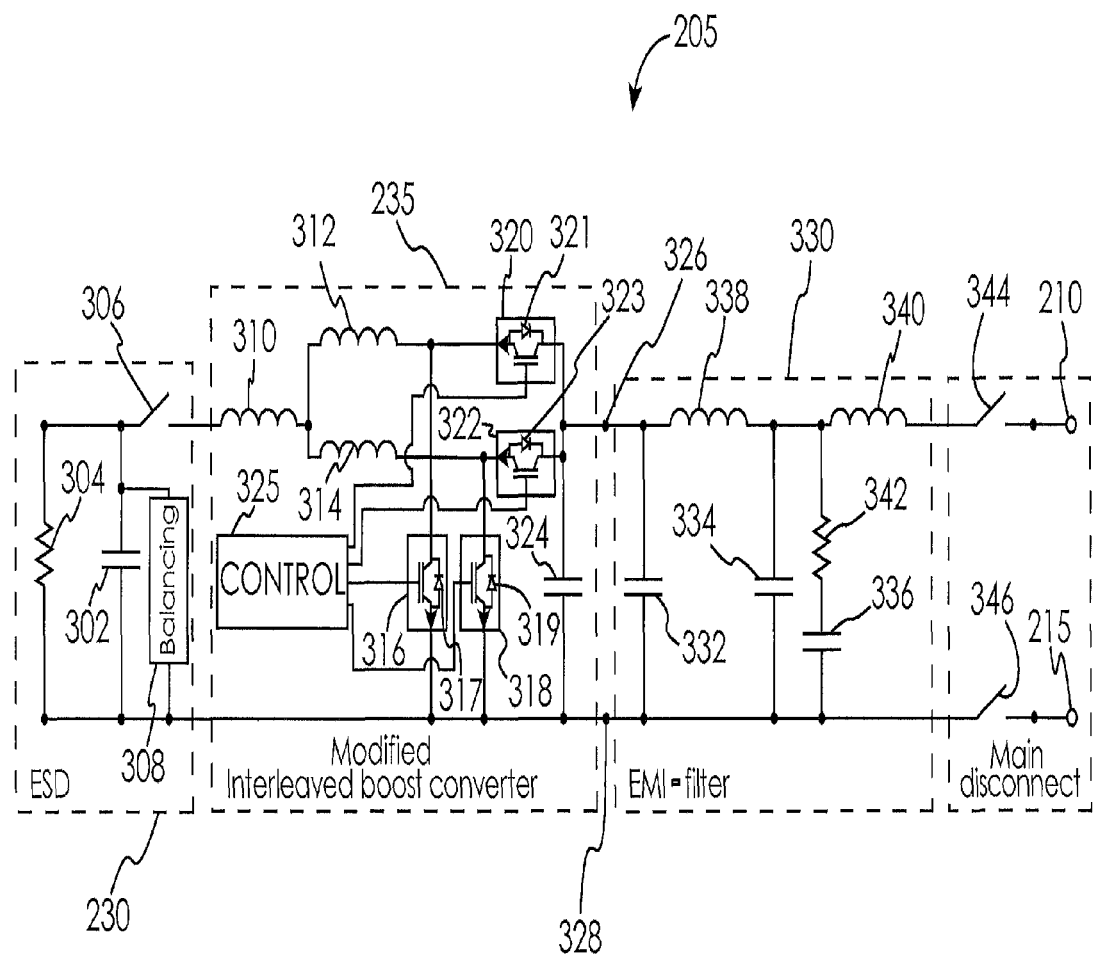
FIG. 3 is a schematic diagram of an EAU according to one embodiment of the present disclosure.

FIG. 3 shows a more detailed schematic diagram of the EAU 205 according to one embodiment of the present disclosure. As shown, the energy storage device 230 optionally comprises a capacitor 302, a safety bleed resistor 304, a disconnect switch 306, and a balancing unit 308. The capacitor 302 may comprise an ultra-capacitor, super-capacitor, conventional capacitor, or any combination thereof in order to achieve the energy reserve capacity required by the specific application. In the preferred embodiment, the capacitor 302 is chosen to have a nominal voltage of approximately 250 Vdc at full charge. It shall be understood that while the illustrated embodiment utilizes the capacitor 302 as the main energy storage component, other types of electrical components may be used to store the reserve energy such as inductors, electro-chemical batteries, mechanical springs, fuel cells, rotating masses (i.e., a flywheel), or pressurized fluids or gases. In addition, still further types of main energy storage components may be used which employ a temperature gradient, a chemical storage, or harness potential energy or mechanical inertia of a mass (e.g., a hydroelectric energy storage device). Certain types of rotating inertia masses may also be used which can absorb energy through a heat pump cycle (e.g., when connected to an engine).

The bleed resistor 304 is connected in parallel with the capacitor 302 to provide safe power drainage from the capacitor 302 when the electrical power system 200 is not in use. Disconnect switch 306 is optionally provided to allow for isolation of the ESD 230 during testing or maintenance procedures. Balancing unit 308 utilizes a standard resistive loss based method and is optionally provided to prevent the voltage across any given capacitive element within the capacitor 302 from exceeding a desired maximum value or from becoming negative.

The power converter 235 is operatively coupled to the energy storage device 230 and preferably comprises a primary inductor 310, leakage inductors 312 and 314, four insulated gate bipolar transistor (IGBT) switches 316,318, 320,322, and a snubber capacitor 324. It shall be understood that while IGBT type switches are shown in the illustrated embodiment, other types of electronic switching devices may be used to open or close the electrical paths between the various circuit components including bipolar transistors, field effect transistors, such as junction field effect transistors (JFETs), metal oxide semiconductor field effect transistors (MOSFETs), relays, and the like.

A control unit 325 actively controls the timing of the IGBT switches 316,318,320,322 as discussed hereinbelow. The control unit 325 may comprise any suitable digital signal processing (DSP) unit known in the art, such as the TMS320F2812 DSP manufactured by Texas Instruments, 12500 TI Boulevard, Dallas, Tex. Control unit 325 may further comprise additional electronic components and integrated circuits (not shown) to enable the control unit 325 to interface with the various circuit elements shown in FIG. 3. The control unit 325 is therefore able to sense and filter multiple circuit variables including, but not limited to, main bus voltage (across bus lines 210,215), EAU 205 voltage, temperature, EAU 205 current, generator 220 current, load 225 current, ESD 230 current, inductor 310 current, and link voltage. In addition, the control unit 325 may be configured to sense the rate of change of any of the above variables for use in a control algorithm. For the sake of clarity, many of the connections between control unit 325 and the other portions of the EAU 205 are omitted from the drawings.

In the preferred embodiment, the power converter 235 is configured in a modified bidirectional interleaving boost arrangement as shown in FIG. 3. This allows the power converter 235 to achieve the reduced switching losses characteristic of discontinuous mode converters while maintaining the large-scale system dynamics of a continuous mode converter. It shall be understood, however, that other converter configurations known in the art may be employed within power converter 235 and are considered to be within the scope of the present disclosure. For example, power converter 235 may comprise a three-phase electromechanical machine drive with an optional electromechanical machine.

The output of the primary inductor 310 is connected to the input of both leakage inductors 312, 314. The component values of the primary inductor 310 and leakage inductors 312,314 are chosen to limit the injected current ripple to 20 amps at the worst case operating point and 5 amps during fully charged operation. Applying these criteria in a preferred embodiment, the primary inductor 310 is approximately 100 micro Henries (µH) and the leakage inductors 312 and 314 are approximately 1.5 µH each, The output of leakage inductor 312 is connected to the collector of IGBT switch 316 and the emitter of IGBT switch 320 as shown. The output of leakage inductor 314 is connected to the collector of IGBT switch 318 and the emitter of IGBT switch 322 as shown. The collectors of IGBT switches 320 and 322 are connected to the positive output 326 of the power converter 235 as shown. The emitters of IGBT switches 316 and 318 are connected to the neutral output 328 of the power converter 235 as shown. Diodes 317,319,321, 323 are connected across the collector and emitter of IGBT switches 316,318,320,322 respectively as shown. The configuration of the IGBT switches 316,318,320,322 and diodes 317,319,321,323 allows the power converter 235 to automatically operate in a bidirectional fashion. The snubber capacitor 324 is connected across the outputs 326,328 of the power converter 235.

The outputs 326,328 of the power converter 235 are fed through an optional electro-magnetic interference (EMI) filter 330 to attenuate the current ripple injected into the aircraft electrical power system to levels which are compliant with the appropriate specifications which govern such injection. In a preferred embodiment, EMI filter 330 is configured in a double-L arrangement and includes capacitors 332,334,336, inductors 338,340, and resistor 342. The output 326 of the power converter 235 is connected to the input of the inductor 338 and capacitor 332. The output of inductor 338 is connected to the input of the capacitor 334, resistor 342, and inductor 340. The output of resistor 342 is connected to the input of capacitor 336. The output of inductor 340 is connected to the +270V bus 210 via switch 344. The outputs of capacitors 332, 334, and 336 are connected to the neutral bus 215 via switch 346. In the preferred embodiment, the component values in the EMI filter 330 are chosen to limit the injected current ripple to military standard MIL-STD-461 levels (much less than 1 amp at most frequencies) under all operating conditions. Using this criteria, capacitors 332 and 334 are chosen to be 160 µF, capacitor 336 is chosen to be approximately 300 µF, inductors 338 and 340 are chosen to be approximately 25 µH, and resistor 342 is chosen to be approximately 0.4 ohms. It shall be understood that the component values within EMI filter 330 may be adjusted based on the needs of the particular application.

Figure 4:
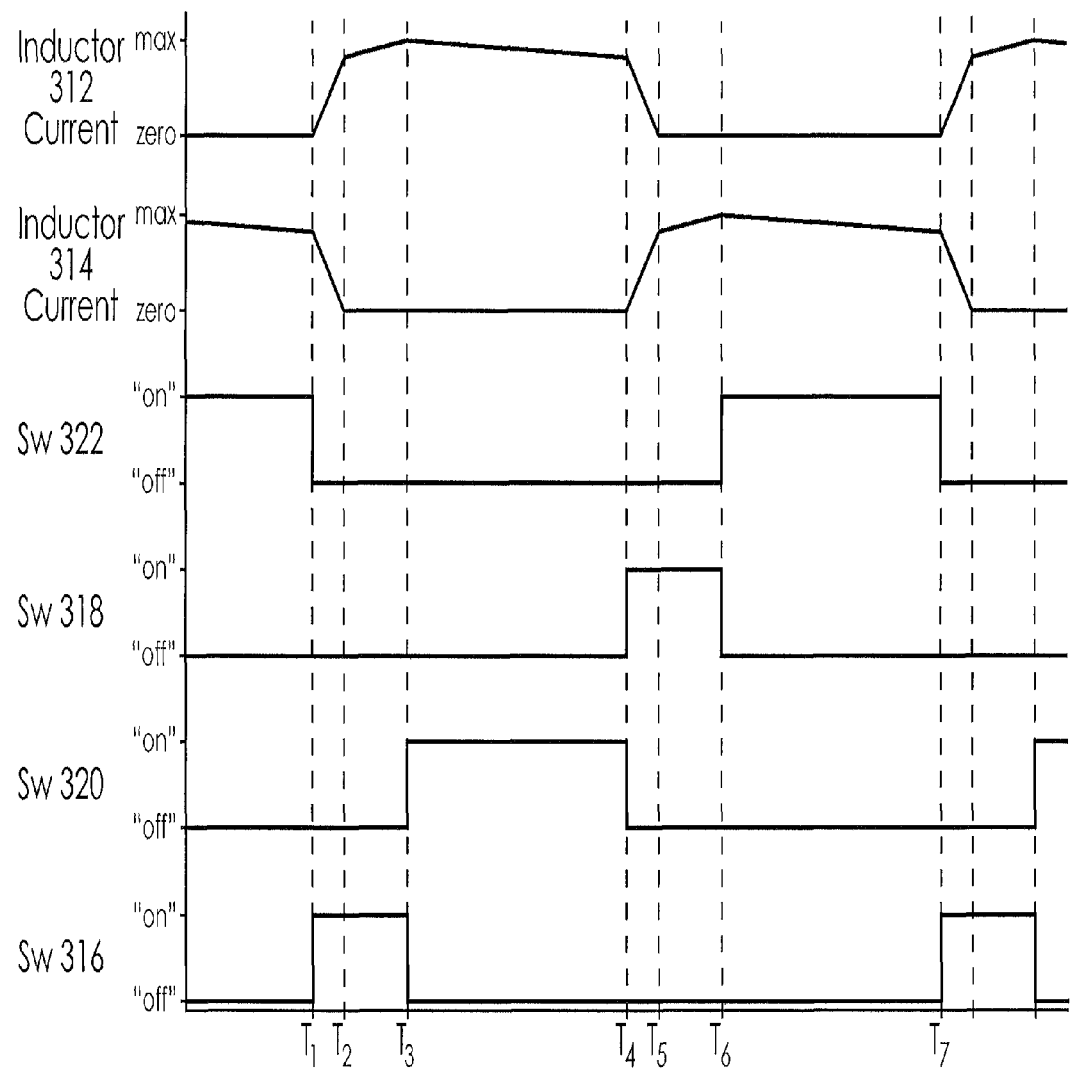
FIG. 4 is a switch timing diagram for power electronic switches within the EAU of FIG. 3 during a time period when the energy storage device within the EAU is being discharged.
Figure 5:
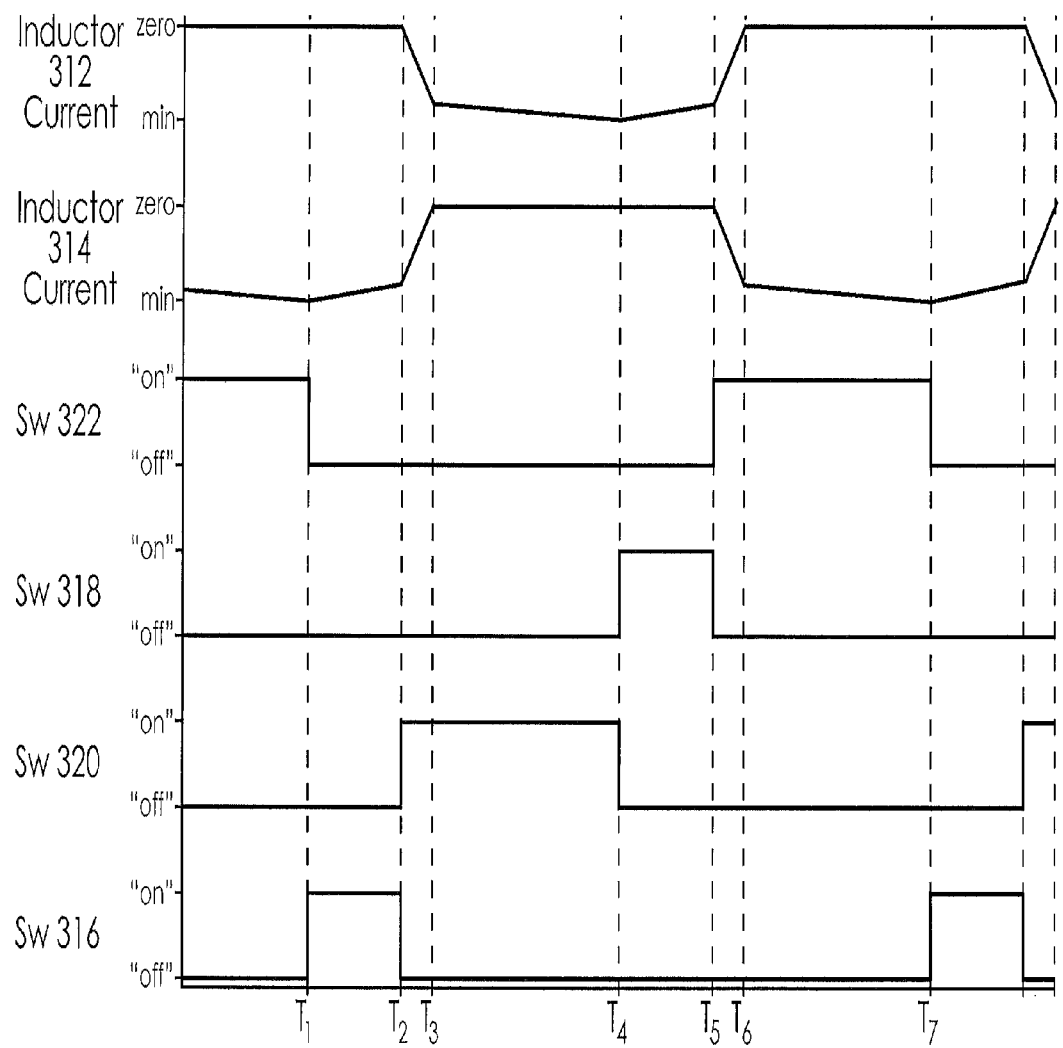
FIG. 5 is a switch timing diagram for power electronic switches within the EAU of FIG. 3 during a time period when the energy storage device within the EAU is being charged.

FIG. 4 shows a detailed description of the timing for the four actively controlled IGBT switches 316,318,320,322 when the energy storage device 230 is being discharged (supplying power to the EPS). Likewise, FIG. 5 shows a similar description of the switch timing when the energy storage device 230 is being charged (absorbing power from the EPS). In the illustrated embodiment, the duty ratio of the switching signals is generated such that if the load power exceeds the transient limits of the generator 220 as specified in the control unit 325, the EAU 205 will attempt to source or sink power as necessary to hold the actual source power to within the specified transient limits. After the load has returned to within the transient limits, the EAU 205 will charge or discharge as necessary to maintain the nominal voltage on the capacitor 302 of 250 Vdc.

Figure 6:
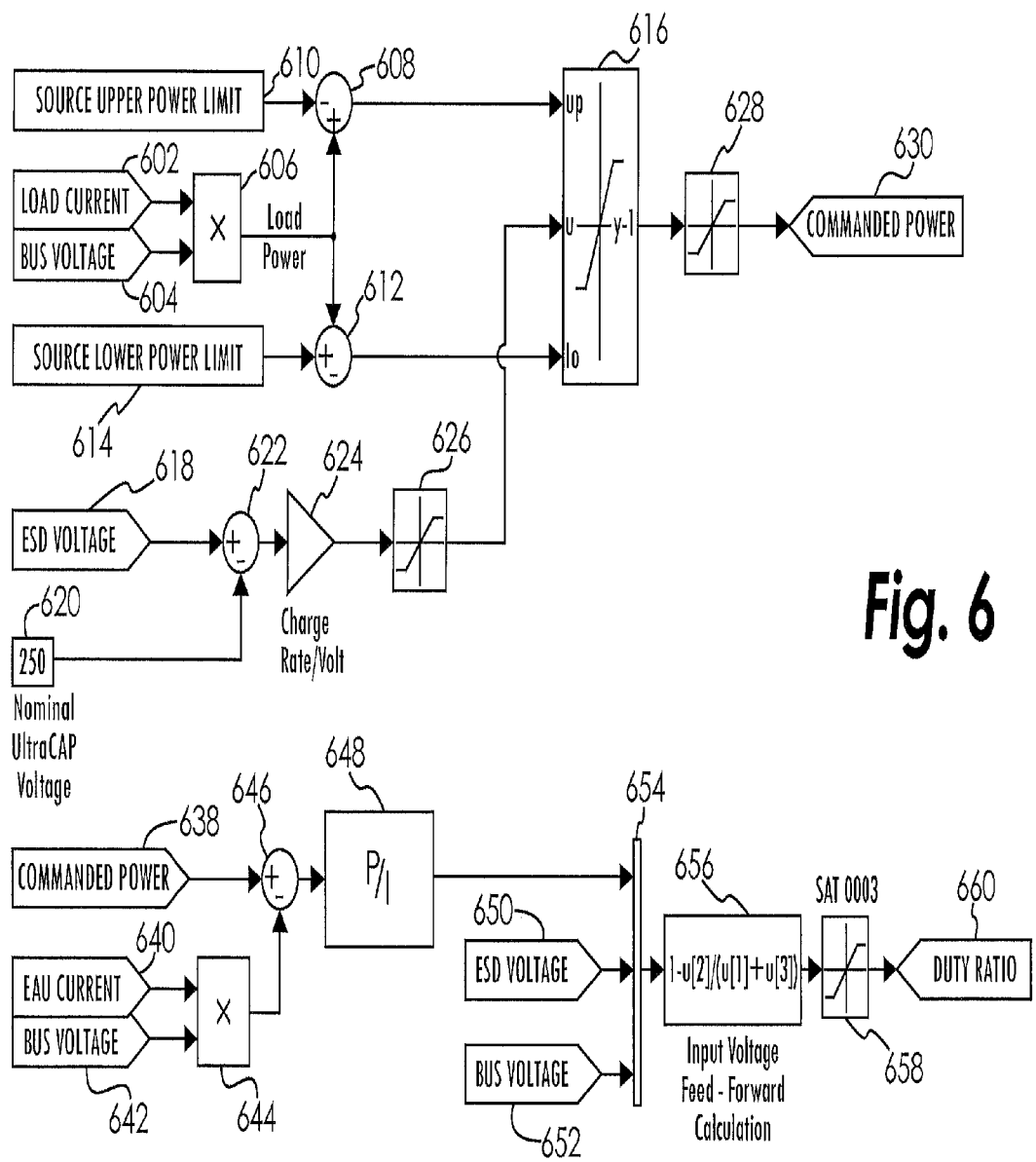
FIG. 6 is a schematic control diagram of the controller logic used to determine the duty cycle for the switching signals of FIGS. 4 and 5.

FIG. 6 illustrates a schematic block diagram of the logic used by the control unit 325 to determine the duty ratio of the IGBT switches 316,318,320,322. The symbols used within FIG. 6 are generally based on standard calculation symbols used within the MATLAB/Simulink programming platform (published by The MathWorks, Inc., of Natick, Mass., USA). In the illustrated embodiment, the main objectives of the controller are: (1) limiting the total power delivered by the generator 220, and (2) maintaining the state of charge of the energy storage device 230 at a nominal value. The first objective is preferably considered to take priority over the second objective. That is, the EAU 205 will not attempt to charge or discharge the energy storage device 230 if such action will cause the load on generator 220 to exceed the specified limits.

Referring again to FIG. 6, the control unit 325 senses the required load current 602 and the main bus voltage 604. These values are multiplied at block 606 to determine the required load power. The required load power is then compared to the source (generator 220) upper power limit 610 at block 608, to determine the maximum allowable EAU power that would not cause a limit violation on the generator 220. The required load power is also compared to the source lower power limit 614 at block 612 to determine the minimum allowable EAU power that would not cause a limit violation on the generator 220. In short, the upper and lower limits of saturation block 616 ensure that the EAU 205 does not supply too much or too little power and cause the generator 220 to run above or below its allowable loading limits. In further embodiments, the upper and lower limits of saturation block 616 may be further adjusted to ensure that the power supplied or absorbed by the EAU 205 does not cause the generator 220 to exceed any upper or lower load rate of change limits.

At block 622, the energy storage device voltage 618 is compared with the specified nominal voltage (250 volts in this case) and fed to block 624. Block 624 multiplies the measured voltage difference by a specified charge rate per volt to determine the charge (or discharge) rate as a unit of power. The output of block 624 is then fed through saturation block 626 in order to limit the charge rate to a specified level, typically based on the capabilities of the chosen energy storage device 230.

Dynamic saturation block 616 receives the output power value of saturation block 626 and compares it with the maximum and minimum allowable EAU power values which will maintain the generator 220 loading limits. If the input value is within the limits, the value is passed unchanged. If the input value is outside either the maximum or minimum allowable EAU value, the value of the respective limit is output.

Saturation block 628 receives the output of dynamic saturation block 616 and further compares the value to the upper and lower power limits of the EAU 205. In other words, saturation block 628 ensures that the commanded power 630 does not cause the EAU 205 to exceed its own charging or discharging limits.

Once the commanded power 636 is determined, it is repeated at block 638 and compared to the measured EAU power at block 646. The measured EAU power is determined by multiplying the measured EAU current 640 by the bus voltage 642 at block 644. The resulting EAU power error signal is output from block 646 and fed to proportional integral controller 648 which determines a desired voltage drop through the EMI filter 330.

The desired EMI filter voltage from block 648 is then fed to input block 654, along with the measured energy storage device voltage 650 and bus voltage 652. These values are then fed to block 656 and used to calculate a duty ratio based on the input/output relationship of an ideal boost converter as follows: The duty ratio of an ideal boost converter is $$V_{out}/V_{in}=1/(1-D)$$

where D is the duty ratio. In the circuit of FIG. 3, $V_{in}$ is equal to the voltage across ESD 230, $V_{out}$ is equal to the idealized voltage across EMI filter 330 ($V_{EMI}$) plus the main bus voltage ($V_{bus}$). Substituting $V_{EMI}+V_{bus}$ for $V_{out}$ in the equation above, we arrive at the following equation for the duty ratio D:

$$D=1-(V_{ESD}/(V_{bus}+V_{EMI}))$$

This equation is applied at block 656 to determine the duty ratio for each of the low side IGBT switches 316 and 318. As calculated above, the duty ratio D corresponds to the period of a half cycle in the overall switching diagrams, that is, from time $T_1$ to $T_4$ or time $T_4$ to $T_7$. Each of the high side IGBT switches 320 and 322 will have a corresponding duty ratio of (1-D), where D is the duty ratio of the corresponding low side IGBT switch. The output of block 656 is then fed through saturation block 658 to limit the duty ratio to a specified upper and lower bound. The upper and lower bounds of saturation block 658 are typically a function of the non-idealities of the circuit and may vary depending on the chosen implementation.

In certain embodiments, the control methodology used above may be modified such that the EAU 205 will emulate the unidirectional or bidirectional power draw characteristics of another load on the power system 200. In still further embodiments, a mechanism of average power generation and/or absorption may be added which interfaces with a source and/or sink which is external to the power system 200.

A more detailed description of the switching signals will now be presented. Again, FIG. 4 illustrates the situation where the energy storage device 230 is discharging and supplying power to the main bus. Starting at time $T_1$, IGBT switch 316 is turned on, inducing an increasing current flow through inductor 312 until time $T_3$. The turning on of switch 316 causes the bulk of the current flowing through inductors 310 and 312 to be directed through switch 316 instead of through diode 321, since switch 316 provides a less resistive path to the neutral bus 328. The rate of increase changes slightly at time $T_2$ due to the different inductance values of inductors 310 and 312. At time $T_3$, switch 316 turns off, allowing current to flow from inductor 312 through diode 321 to the output 326. Switch 320 also turns on at time $T_3$, however the main current will be flowing through diode 321 at this time. Inductor 312 continues to discharge, supplying power to the main bus from time $T_3$ to time $T_4$. At time $T_4$, switch 320 turns off and switch 318 turns on, inducing an increasing current to flow through inductor 314 and switch 318 until time $T_6$. From time $T_4$ to time $T_6$, inductor 314 is therefore charging. At time $T_6$, switch 318 turns off, allowing current to flow from inductor 314 through diode 323 to the output 326. Switch 322 also turns on at time $T_6$, however the main current will be flowing through diode 323 at this time. Inductor 314 continues to discharge, supplying power to the main bus from time $T_6$ to time $T_7$. At time $T_7$, the process begins again when switch 322 turns off and switch 316 turns on.

Referring again to FIG. 5, the situation will be described where the energy storage device 230 is being charged by the main generator 220 using the power converter 235. Starting at time $T_1$, switch 316 turns on and switch 322 turns off. Because current was flowing through inductor 314 prior to switch 316 turning on, current will now flow from the neutral bus 328, through the diode 319, through inductors 314 and 310 and into energy storage device 230. At time $T_2$, switch 316 turns off and switch 320 turns on. This causes current to begin flowing from the main generator 220 to node 326, through switch 320, and through the inductors 312 and 310. The current through inductors 312 and 310 continues to increase negatively until time $T_4$. At time $T_4$, switch 320 turns off and switch 318 turns on. Again, because currently was previously flowing through inductor 312, current will now flow from the neutral bus 328, through diode 317, through inductors 312 and 310, and into the energy storage device 230. At time $T_5$, switch 318 turns off and switch 322 turns on, allowing current to begin flowing from the main generator 220, through switch 322, and through the inductors 314 and 310. The current through inductors 314 and 310 continues to increase negatively until time $T_7$. At time $T_7$, switch 322 turns off and switch 318 turns on, starting the process over again.

As can be seen from FIGS. 4 and 5, the modified bidirectional interleaving boost arrangement illustrated in FIG. 3 allows the EAU 205 to both source and sink power from the electrical network 200 as needed while maintaining the same relative switching order of switches 316,318,320, 322, with only the duty ratio being altered. It shall be understood that additional dead time appropriate for IGBT switches may be inserted between the high side (switches 320, 322) and low side (switches 316, 318) switching signals shown in FIG. 4 before being fed through appropriate isolation and gate-drive circuitry (not shown) to the gates of IGBT switches 316,317,318,320.

Figure 7:
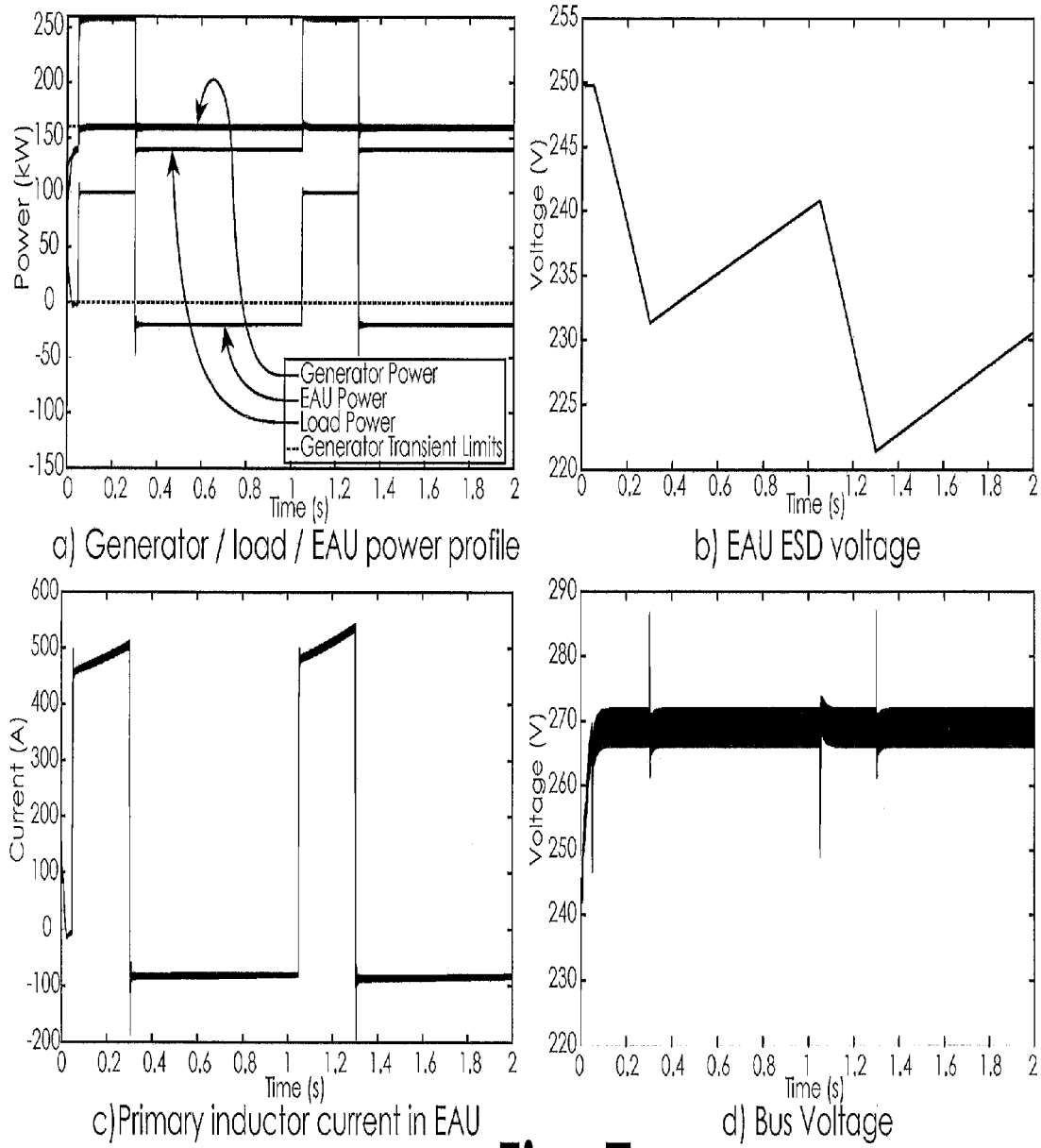
FIGS. 7*a*-7*d* depict typical EAU transient performance results against a 1 Hz step load with a duty ratio of 0.25.

FIGS. 7a-7d provide detailed waveforms illustrating the performance of the specified embodiment of the EAU 200 when connected to a representative power network including a generator with transient limits at 160/0 kW (max/min) and a 1 Hz step load with a 25% duty ratio. As shown in FIG. 7a, once the load power jumps to 260 kW at approximately time 0.05 seconds, the EAU 205 begins supplying the 100 kW needed to keep the generator 220 operating at 160 kW. At approximately time 0.3 seconds, when the load drops to approximately 140 kW, the EAU 205 begins sinking 20 kW in order to recharge the energy storage device 230, while allowing the generator 220 to remain operating safely at its 160 kW limit. This continues until time 1.05 seconds when the load power again jumps to 260 kW.

FIG. 7b illustrates the charging and discharging cycles of the energy storage device 230 in response to the 1 Hz step load. From time 0.05 seconds to time 0.3 seconds, the voltage across the capacitor 302 is decreasing as the EAU 205 supplies power to the system bus 210, 215. From time 0.3 seconds to time 1.05 seconds, the voltage across capacitor 302 is increasing as the EAU sinks power to charge the capacitor 302.

FIG. 7c shows the resulting current through inductor 310 as the 1 Hz step load is applied. At time 0.05 seconds, the current through inductor 310 jumps in response to the step load and continues to rise until time 0.3 seconds, at which point the current reverses as the capacitor 302 is recharged. FIG. 7d shows the resulting voltage across the system bus 210, 215, which is held close to the target value of 270 volts throughout the sample time with the exception of minor spikes at the step transitions.

FIGS. 8a-8d provide detailed waveforms illustrating the intended performance of the specified embodiment of the EAU 205 when connected to a representative power network including a generator 220 with transient limits at 160/0 kW (max/min) and a 20 Hz sinusoidal load with a 100 kW peak-to-peak loading. Again, as soon as the sinusoidal load exceeds the generator 220 capabilities at time 0.05 seconds (indicated by arrow 802), the EAU 205 power flow is adjusted to hold the generator loading to within the specified transient limits. After the load falls within the transient limits at approximately time 0.075 seconds (indicated by arrow 804), the EAU 205 attempts to recharge the energy storage device 230 without exceeding the limits of the generator 220.

Figure 8:
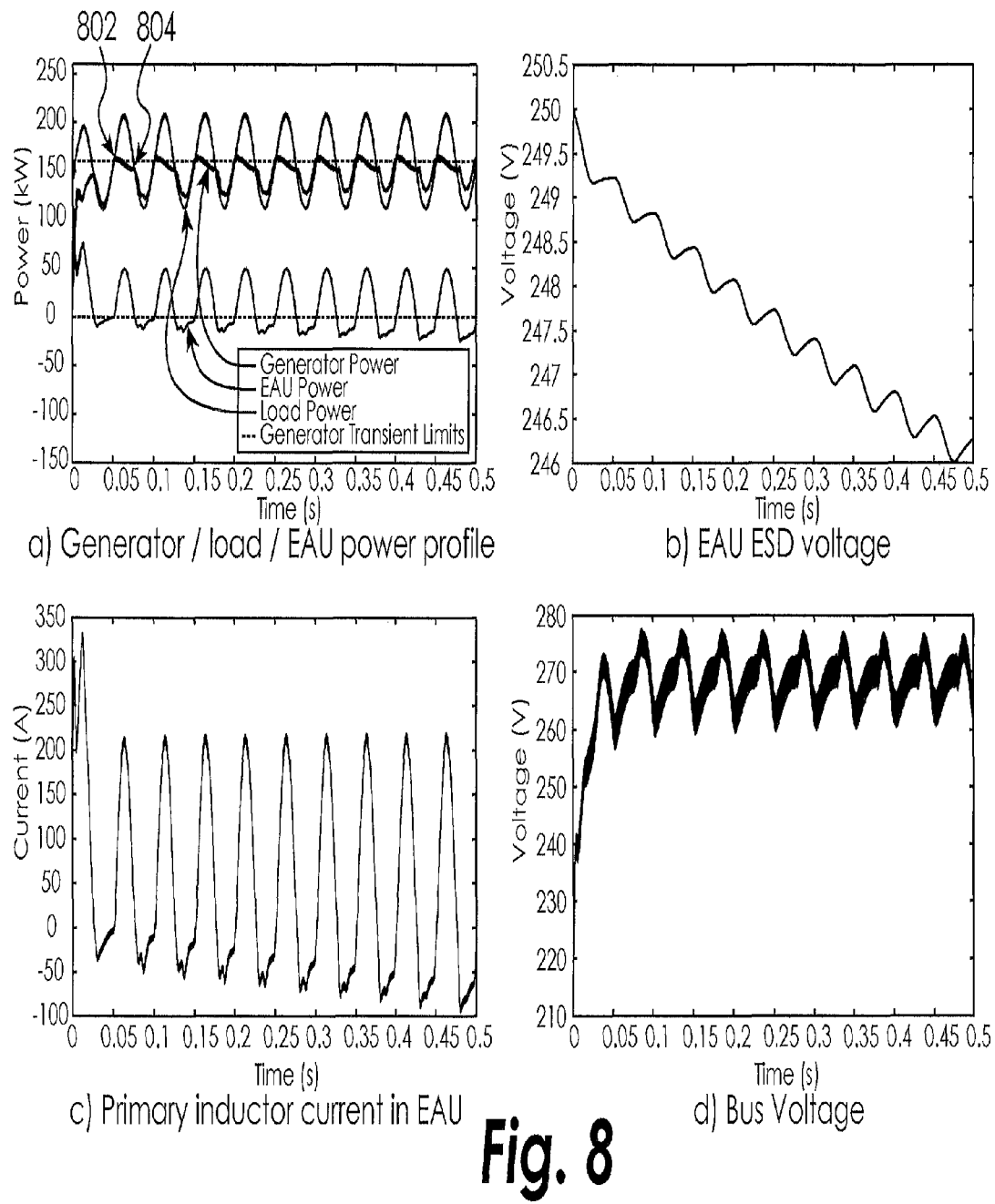
FIGS. 8*a*-8*d* depict typical EAU transient performance results against a 20 Hz, 100 KW (p-p) sinusoidal load.

FIG. 8b illustrates the charging and discharging cycles of the energy storage device 230 in response to the sinusoidal load. From time 0.05 seconds to time 0.075 seconds, the voltage across the capacitor 302 is decreasing as the EAU 205 supplies power to the system bus 210, 215. From time 0.075 seconds to time 0.1 seconds, the voltage across capacitor 302 is increasing as the EAU sinks power to charge the capacitor 302. The process repeats when the load power begins to increase again at time 0.1 seconds.

FIG. 8c shows the resulting current through inductor 310 as the sinusoidal load is applied. From time 0.05 seconds to time 0.075 seconds, the current through inductor 310 increases and decreases in response the portion of the sinusoidal load which is beyond the limits of the generator 220. From time 0.075 seconds to time 0.1 seconds, the current through inductor 310 reverses as some portion of the power supplied by the generator 220 is used to charge the capacitor 302. FIG. 8d shows the resulting voltage across the system bus 210, 215 in response to the sinusoidal load.

Figure 9:
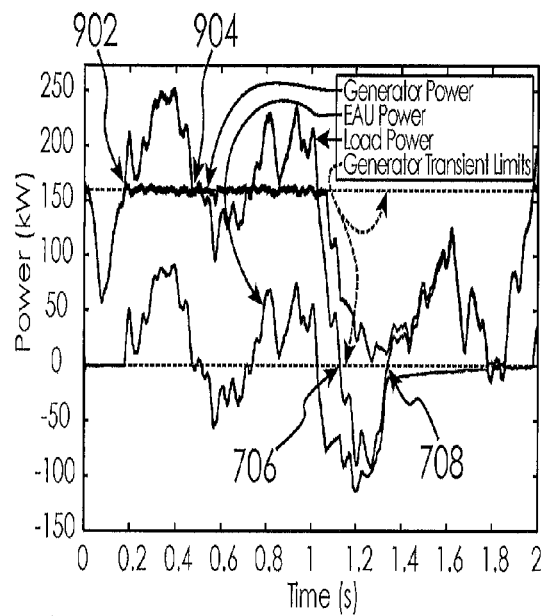
FIGS. 9*a*-9*d* depict typical EAU transient performance results against a representative aircraft load.
Figure 9:
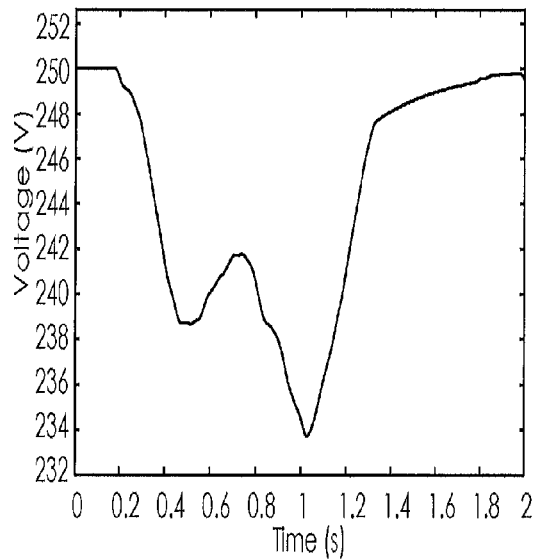
Figure 9:
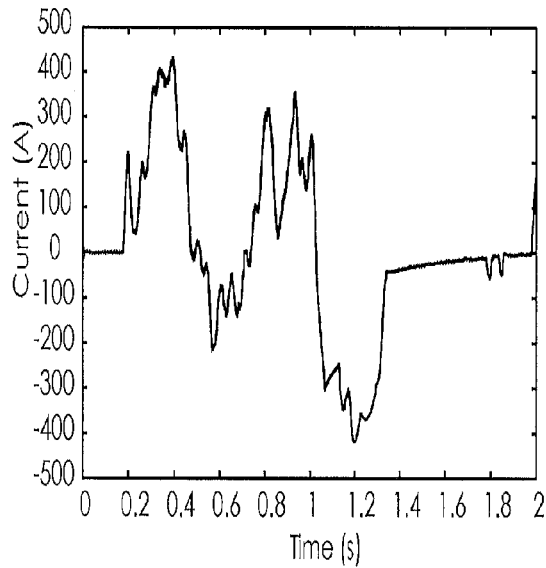
Figure 9:
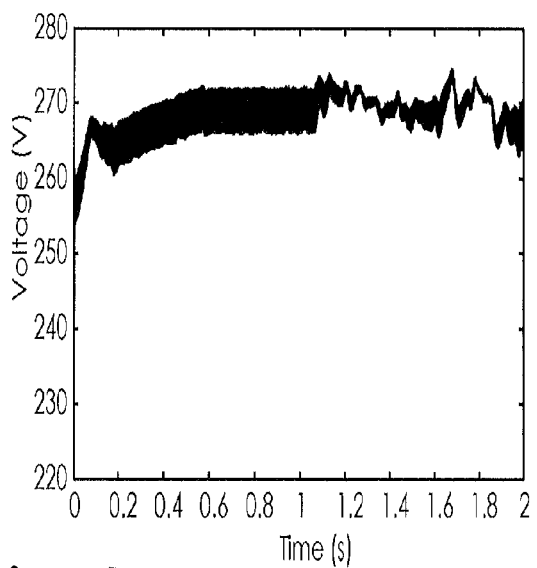

FIGS. 9a-9d provide detailed waveforms illustrating the intended performance of the specified embodiment of the EAU 205 when connected to a representative power network 200 including a generator 220 and an aggregate load representative of a full aircraft loading profile. As shown in FIG. 9a, from time 0 seconds to time 0.2 seconds, the generator 220 is safely supplying all of the power to the network 200 with the EAU 205 holding steady at 0 kW. Once the load jumps above the 160 kW generator limit at time 0.2 (indicated by arrow 902), the EAU 205 power flow is adjusted to hold the generator 220 loading to within the 160 kW limit. At approximately time 0.45 seconds (indicated by arrow 904), the load falls below the 160 kW, at which point the EAU 205 begins sinking power to recharge the energy storage device 230 while holding the generator at its 160 kW limit. In the case where the load actually drops below zero (between times indicated by arrows 706 and 708), the EAU 205 begins sinking a greater amount of power in order to prevent the generator 220 from going into regenerative mode.

FIG. 9b illustrates the charging and discharging cycles of the energy storage device 230 in response to the aircraft loading profile. From time 0 seconds to time 0.2 seconds, the voltage across the capacitor 302 remains steady at 250 volts. From time 0.2 seconds to time 0.45 seconds, the voltage across the capacitor 302 is decreasing as the EAU 205 supplies power to the system bus 210, 215. From time 0.45 seconds to time 0.7 seconds, the voltage across capacitor 302 is increasing as the EAU sinks power to charge the capacitor 302.

FIG. 9c shows the resulting current through inductor 310 as the aircraft load is applied. From time 0 seconds to time 0.2 seconds, the inductor 310 current remains at zero. From time 0.2 seconds to time 0.45 seconds, the current through inductor 310 increases and decreases in response the portion of the load which is beyond the limits of the generator 220. From time 0.45 seconds to time 0.7 seconds, the current through inductor 310 reverses as some portion of the power supplied by the generator 220 is used to charge the capacitor 302. FIG. 9d shows the resulting voltage across the system bus 210, 215 in response to the aircraft load.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A device for providing auxiliary power to an electrical network comprising:
    an energy storage device; and
    a power converter coupled in parallel to said electrical network and operatively coupled to said energy storage device;
    wherein power flow is provided between said power converter and said energy storage device in response to a measured property related to said electrical network.

2. The device of claim 1, wherein said power converter comprises an actively controlled power converter.

3. The device of claim 1, wherein said power flow is adjusted to regulate an electrical load seen by a primary electrical source; and
wherein said power flow is further adjusted to regulate energy stored in the said energy storage device if said electrical load is within a specified range.

4. The device of claim 1, wherein said measured property is selected from the group consisting of temperature, system state, operating mode, torque, voltage, current and power.

5. The device of claim 1, wherein a rate of change of said measured property is used by said power converter to determine said power flow between said power converter and said energy storage device.

6. The device of claim 5, wherein said rate of change is at least one of measured directly or measured approximately through the filtering of measured signals.

7. The device of claim 1, wherein said power converter comprises a plurality of electronic switches and a plurality of diodes, each one of said diodes connected across a collector and emitter of one of said electronic switches such that a forward bias current of each one of said diodes is from said emitter to said collector of a corresponding electronic switch.

8. The device of claim 7, wherein said plurality of electronic switches comprises two low side electronic switches and two high side electronic switches;
wherein said emitter of each low side electronic switch is connected to a low-side bus and said collector of each low side electronic switch is connected to at least one inductor in said power converter; and
wherein said collector of each high side electronic switch is connected to a high-side bus in said electrical network and said emitter of each high side electronic switch is connected to said at least one inductor in said power converter.

9. The device of claim 7, wherein said plurality of electronic switches comprises IGBT switches.

10. The device of claim 7, wherein said plurality of electronic switches comprises MOSFETs.

11. The device of claim 1, wherein said power converter comprises a boost converter.

12. The device of claim 1, wherein said power converter comprises an interleaved boost converter.

13. The device of claim 1, wherein said power converter comprises a bidirectional interleaved boost converter.

14. The device of claim 1, wherein said power converter comprises a bidirectional interleaved boost converter coupled to a capacitor ladder.

15. The device of claim 1, wherein said energy storage device is selected from the group consisting of an ultracapacitor, a conventional capacitor, an inductor, an electrochemical battery, a mechanical spring, a fuel cell, a rotating mass, a pressurized fluid, and a pressurized gas.

16. The device of claim 1, wherein said electrical network is connected to a platform selected from the group consisting of an aircraft, a marine vehicle, a terrestrial vehicle, and a non-moving environment.

17. The device of claim 1, wherein said power converter is configured to limit a power draw seen by a primary power source on said electrical network to being within a specified maximum and minimum limit despite loads which draw or source power outside of a maximum and minimum limit.

18. The device of claim 17, wherein said power converter is further configured to maintain a charge of said energy storage device if said primary power source is operating within said specified maximum and minimum limit.

19. The device of claim 1, wherein a frequency domain content of said measured property is used by said power converter to determine said power flow between said power converter and said energy storage device.

20. A method for controlling power flow into an electrical network from an EAU and out of the electrical network to the EAU comprising the acts of:
(a) coupling the EAU in parallel to the electrical network;
(b) sensing at least a property of the electrical network; and
(c) providing power flow between the EAU and the energy storage device in response to the sensed property related to the electrical network.

21. The method of claim 20, wherein step (c) comprises providing automatic bidirectional power flow into and out of the electrical network from and to, respectively, the EAU in response to the at least one sensed property.

22. The method of claim 20, wherein the at least one sensed property comprises at least one sensed electrical property.

23. The method of claim 20, wherein said at least one property is selected from the group consisting of temperature, system state, operating mode, torque, voltage, current and power.

24. The method of claim 20, wherein a rate of change of said at least one property is used at least in part to determine said power flow.

25. The method of claim 20 further comprising measuring said rate of change at least one of directly or approximately through the filtering of measured signals.

26. The method of claim 20, wherein:
act (b) comprises:
(b.1) sensing a required load power; and
act (c) comprises:
(c.1) determining an upper EAU power limit which will prevent a primary power source from exceeding a primary power source upper limit;
(c.2) determining a lower EAU power limit which will prevent the primary power source from exceeding a primary power source lower limit;
(c.3) determining a commanded power value based on a voltage differential between the energy storage device and a nominal voltage;
(c.4) ensuring that the commanded power value does not exceed the upper EAU power limit or the lower EAU power limit;
(c.5) determining a first duty ratio D of a power converter of the EAU based on the commanded power value; and
(c.6) applying a signal having the first duty ratio to said power converter to sink or source power from or to, respectively, the electrical network.

27. The method of claim 26, wherein said upper EAU power limit is chosen to further prevent the primary power source from exceeding a primary power source upper rate of change limit; and
wherein said lower EAU power limit is chosen to further prevent the primary power source from exceeding a primary power source lower rate of change limit.

28. The method of claim 26, wherein the first duty ratio D is used to control at least one low side electronic switch within the power converter; and
wherein a value of (1-D) is used as a second duty ratio to control at least one high side electronic switch within the power converter.

29. The method of claim 28, wherein the same relative switching order is used to control the low side and high side electronic switches in the power converter regardless of whether the EAU is sourcing or sinking power to the electrical network.

30. The method of claim 26, wherein a proportional integral controller is used to determine an idealized output voltage of the power converter based upon a differential between the commanded power value and a measured EAU power value.

31. The method of claim 30, where the duty ratio is determined based on the idealized power converter output voltage, a measured voltage across an energy storage device of the EAU, and a measured voltage across a bus of the electrical network.

32. The method of claim 20, further comprising using a frequency domain content of the measured property to determine the power flow between the power converter and the energy storage device.

* * * * *